US007740422B2

(12) United States Patent
Heerten et al.

(10) Patent No.: US 7,740,422 B2
(45) Date of Patent: *Jun. 22, 2010

(54) METHOD FOR PRODUCING LARGE SURFACE AREA GEOGRIDS WITH HIGH TENSILE STRENGTH AND LARGE SURFACE AREA GEOGRIDS

(75) Inventors: Georg Heerten, Lübbecke (DE); Volkhard Müller, Petershagen (DE); Stephan Priewich, Lübbecke (DE); Werner Uehlemann, Espelkamp (DE)

(73) Assignee: Naue GmbH & Co. KG, Espelkamp-Fiestel (DE)

( * ) Notice: Subject to any disclaimer, the term of this patent is extended or adjusted under 35 U.S.C. 154(b) by 929 days.

This patent is subject to a terminal disclaimer.

(21) Appl. No.: 11/507,394

(22) Filed: Aug. 22, 2006

(65) Prior Publication Data

US 2008/0066847 A1 Mar. 20, 2008

Related U.S. Application Data

(60) Continuation of application No. 10/443,264, filed on May 22, 2003, now abandoned, which is a division of application No. 09/535,621, filed on Mar. 27, 2000, now Pat. No. 6,572,718.

(30) Foreign Application Priority Data

Mar. 25, 1999 (DE) ............................... 199 13 479

(51) Int. Cl.
*E02D 17/20* (2006.01)
(52) U.S. Cl. .................................. 405/302.7; 156/73.6
(58) Field of Classification Search ............. 405/302.7, 405/302.6, 302.4, 258.1, 15; 156/73.6, 73.1, 156/73.2, 73.5, 359, 580.1, 580.2
See application file for complete search history.

(56) References Cited

U.S. PATENT DOCUMENTS

| 5,108,222 | A | * | 4/1992 | Jansson et al. | ................. 405/15 |
| 5,156,495 | A | * | 10/1992 | Mercer | .................... 405/302.7 |
| 5,267,816 | A | * | 12/1993 | Mercer et al. | ............ 405/302.7 |
| 5,277,520 | A | * | 1/1994 | Travis | ..................... 405/302.3 |
| 5,419,659 | A | * | 5/1995 | Mercer | .................... 405/302.7 |
| 5,735,640 | A | * | 4/1998 | Meyer et al. | ............. 405/302.7 |
| 5,851,089 | A | * | 12/1998 | Beretta | ..................... 405/302.7 |
| 6,139,955 | A | * | 10/2000 | Girgis | ..................... 405/302.7 |
| 6,171,984 | B1 | * | 1/2001 | Paulson et al. | ................. 405/15 |
| 6,572,718 | B2 | * | 6/2003 | Heerten et al. | ........... 405/302.7 |
| 2004/0062615 | A1 | * | 4/2004 | Walsh | ..................... 405/302.7 |
| 2005/0048256 | A1 | * | 3/2005 | Heerten et al. | ........... 405/302.7 |
| 2006/0116040 | A1 | * | 6/2006 | Yun et al. | ...................... 442/2 |

* cited by examiner

*Primary Examiner*—Frederick L Lagman
(74) *Attorney, Agent, or Firm*—Horst M. Kasper

(57) ABSTRACT

The invention provides large surface area geogrids with a high tensile strength, a method and apparatus for producing them, and their use as drain and reinforcement grids and as fences. The method for the continuous production of geogrids which have a large surface area and comprise thermoplastic bars which cross one another and are joined together by welding at the areas where they cross one another is characterized in that single-layer, homogeneous, molecular-oriented plastic bars with a high tensile strength are used and a multiplicity of crossing areas arranged behind one another and next to one another are intermittently welded simultaneously using the vibration-welding technique. In this method, a newly developed vibration-welding apparatus is used, which is characterized in that it has at least one vibration device which can be used to weld at least 100 crossing areas, preferably up to 500 crossing areas, simultaneously.

16 Claims, No Drawings

METHOD FOR PRODUCING LARGE SURFACE AREA GEOGRIDS WITH HIGH TENSILE STRENGTH AND LARGE SURFACE AREA GEOGRIDS

REFERENCE TO RELATED APPLICATIONS

This application is a continuation application and/or divisional application of U.S. patent application Ser. No. 10/443,264 filed on May 22, 2003, now abandoned which in turn is a divisional application of U.S. application Ser. No. 09/535,621 filed on Mar. 27, 2000 which since has issued as U.S. Pat. No. 6,572,718.

The present invention relates to large surface area geogrids with a high tensile strength, a method and apparatus for producing them, and their use as drain and reinforcement grids.

Geogrids of this nature are used, for example, to secure road and rail structures, to secure earth, to stabilize slopes and to secure landfill sealing systems.

The so-called Tensar® geogrids produced by Netlon have been in use throughout the world in a very wide range of application areas since as early as the late 1970s.

To produce geogrids of this nature, extruded polyethylene or polypropylene webs are perforated at regular intervals. While being heated, the webs are stretched either in the longitudinal direction (uniaxially) as described in British Patent 2,073,090 or in the longitudinal and transverse directions (biaxially) as described in British Patent 2,035,191. The stretching brings the polymer molecules of a randomly arranged layer into an ordered and aligned position in the direction of stretching. This method increases the tensile strength and the rigidity of the geogrids. A further development to these geogrids is described in U.S. Pat. No. 4,618,385 (Mercer). However, these geogrids have the problem that the grid points cannot be stretched uniformly in the same way as the webs running between the grid points, so that with grids which have been stretched in this way the strength with respect to the weight per square meter is to a certain extent unsatisfactory.

In order to improve the ratio of strength to weight per square meter, DE-C 41 37 10 (Akzo) has described a method for producing geogrids in which firstly strips comprising two layers of polymers which have different melting ranges are produced and then stretched (molecular-oriented bicomponent strips). Then, the strips are laid crosswise in rows, in such a manner that the side of the strips which has the lower melting range rests against another such side. The resultant structure is then exposed to a temperature which is above the melting range of the polymer with the lower melting range but below the melting range of the polymer with the higher melting range. As a result, the intersections of the strips of adjacent rows are joined together via the polymer with the low melting range.

British Patent Application 2,314,802 (Mercer) is based on a similar method. In this document, the introduction to the description states, with regard to the prior art, that the Signode company produces geogrids made from molecular-oriented polyester ribbons which are coated on one side with a plastic which has a lower melting point (bicomponent ribbons). These bicomponent polyester ribbons are then placed crosswise on top of one another in such a way that those sides which have a low melting point bear against one another in the crossing areas. Then, the crossing areas are welded.

The drawback of these geogrids is that the strength of the join in the crossing areas, which is predetermined by the lower-melting polymer component, is unsatisfactory.

To eliminate this drawback, the above mentioned British Patent Application 2,314,802 (applied for on 2 Jul. 1996 and published on 14 Jan. 1998) has developed a method in which molecular-oriented bicomponent strips are also used, but with the modification that one bottom bicomponent strip and one top bicomponent strip per grid web are positioned in the direction of the machine, specifically in such a way that those sides of the two strips which have the lower melting point rest on top of one another over their entire surfaces after the transverse strips have been introduced. Then, in each case the bottom bicomponent strips, with the inclusion of the transverse strips, are joined to the top bicomponent strips over their entire surfaces by means of flame welding or hot-air welding.

Although this method does increase the strength of the join in the crossing area, it has the drawback that, considered from a materials perspective, two different polymers are required in order to produce the bicomponent strips and in each case two bicomponent strips are required to form the corresponding web component.

Therefore, the object of the present invention is to provide a large surface area geogrid which has a high tensile strength and is produced by welding from single-layer, homogeneous, molecular-oriented bars which have a high tensile strength and do not have any additional coatings, in such a way that, on the one hand, a satisfactory bonding strength is achieved in the welded crossing areas of the plastic bars, but without significantly impairing the molecular orientation, i.e. the tensile strength of the plastic bars in the crossing areas, and, on the other hand, it is possible to ensure an economic production rate.

This object is achieved by using single-layer, homogeneous, molecular-oriented plastic bars with a high tensile strength and by using the vibration-welding technique, with a multiplicity of crossing areas, which are arranged next to and behind one another, of the single-layer, homogeneous, molecular-oriented plastic bars which have a high tensile strength and cross one another being intermittently joined together simultaneously under identical conditions and under pressure.

The vibration-welding technique comprises a friction-welding process, in which the crossing areas of the plastic bars resting on top of one another are plasticized not by the external supply of heat, but rather by the direct conversion of frictional energy into heat. For this purpose, the plastic bars, at their crossing areas, are made to vibrate with frequencies and amplitudes which are such that the surfaces soften and, in this way, are welded together under high pressure. Therefore, the principal feature of vibration welding is the reciprocating movement in order to generate the friction, so that the heat of fusion only acts on the surfaces of the bars and the molecular orientation is only lost on the surface of the plastic bars. Moreover, this method has the advantage of short heating and cooling times, since heating takes place only at the surfaces, so that short cycle times are possible, enabling the desired economic production rate to be achieved, i.e. the large surface area geogrids according to the invention can be produced with an overall width of, for example, 5 m and a distance between the plastic ribbons, from ribbon centre to ribbon centre, of approx. 3 cm, at a rate of at least 2.5 m per minute.

Originally, this was not considered possible, since it was assumed that, given an expected surface pressure of approx. 1.5 N/mm$^2$ and a width of the plastic rods of, for example, 12 mm with a 3 cm mesh and approx. 5000 crossing areas to be welded, forces of approx. 1,000,000 y would be generated, which would make controllable welding quite impossible. Furthermore, it was assumed that, with vibrations of from 60

Hz to 300 Hz and given the large number of crossing areas to be welded simultaneously, the machine components would be destroyed.

However, surprisingly it has been found that, given a suitably heavy-duty design of the welding benches, it is possible for these forces to be tolerated, and consequently it is possible for, for example, from 500 to 8000 crossing areas to be welded simultaneously.

The essential factor allowing this improvement was the development, according to the invention, of a novel vibration-welding device equipped with a vibration plate which has a large surface area, corresponding foundations and corresponding control and pressure systems, and of bar supply arrangements. A plurality of these novel vibration-welding devices are set up next to one another and made to vibrate simultaneously under equal pressure conditions at identical amplitudes and frequencies. The amplitudes and frequencies are controlled in such a way that the amplitudes lie in the range from 0.5 mm to 2.5 mm, preferably from 1 f to 2 f, and the frequencies lie in the range from 60 to 300 Hz, preferably from 150 to 180 Hz.

Since a vibration-welding device according to the invention can be used to weld from 100 to 500 crossing areas, depending on the distance between the crossing areas and the width of the bars, which was hitherto inconceivable, the present invention has enabled large surface area geogrids to be produced in any desired widths, preferably in widths of from 3 to 6 m by setting up a corresponding number of vibration-welding units according to the invention next to one another.

The bars which are supplied in the longitudinal direction, i.e. in the direction of the machine, referred to below as longitudinal bars, are preferably supplied parallel to and at equal distances from one another. The bars which run transversely to the longitudinal direction, referred to below as transverse bars, are preferably laid at right angles to the longitudinal direction by being laid onto the longitudinal bars, with the longitudinal and transverse bars preferably forming square or more or less elongate, rectangular grid openings. Naturally, however, the transverse bars may also cross the parallel longitudinal bars at an angle of from 45° to 90°.

The distances between the longitudinal bars, on the one hand, and the transverse bars, on the other hand, may be selected as desired, and are preferably in the range from 10 mm to 100 mm, in particular in the range from 20 mm to 80 mm, in each case measured from side edge to side edge of the bars.

When producing the large surface area geogrids according to the invention, the procedure is such that the number of plastic bars arranged in the direction of the machine and the corresponding number of plastic bars in the direction transverse thereto are such that the overall width of the geogrid is from 3 m to 6 m preferably is 5 m, and the overall length is from 25 m to 50 m preferably from 50 m to 100 m.

The plastic bars which are used according to the invention are either square in cross section, preferably with side lengths of from 2.0 mm to 6.0 mm, in particular from 2.5 mm to 4.5 mm, or are rectangular in cross section, preferably having a width of from 5 mm to 40 mm, in particular of 10 mm, 12 mm or 16 mm, and a thickness of from 0.4 mm to 2.5 mm, in particular from 1.0 mm to 1.5 mm.

According to a particular embodiment, the longitudinal bars used are plastic bars which are wider and/or thicker than the transverse bars.

The thermoplastics which are preferably used include polyesters (PES), for example polyethylene terephthalate (PET), polyolefins, for example high-density polyethylene (HDPE) or polypropylene (PP), polyamides (PA), e.g. PA 6 and PA 66, aramid and polyvinyl alcohols (PVA).

In particular, the thermoplastics employed are polyethylene terephthalate (PET) or polypropylene (PP). To ensure that the tensile strength is as high as possible, the stretch ratio in the case of PP should be at most 1:15, preferably 1:9 to 1:13. In the case of PET, a maximum stretch ratio of 1:10, preferably 1:6 to 1:8, is appropriate, with which extensions of from 5% to 20% under the maximum tensile force can be achieved.

The strength of the plastic bars is preferably between 300 N/mm$^2$ and 800 N/mm$^2$, and they may be flexible or rigid.

Since the interaction between the reinforcement grid and earth is based on the activation of frictional forces between earth and grid, the grid bars may preferably be provided, on their top and/or bottom sides, with a profiling/stamping which increases the friction/contact with respect to the earth.

Possible stamped structures are, for example, diamond-shaped structures with a stamped depth of from 0.05 mm to 0.5 mm. However, the stamped depth should be between 0.5% and 30% of the thickness of the plastic bars. By way of example, the stamped depth may be 0.15 f per side if the plastic bar is 1.5 mm thick.

Examples of further possible stamped structures are
longitudinal grooves
transverse grooves
honeycomb structures
diamond-shaped structures with spikes
projections, spikes, etc.
or combinations of the above mentioned stamped structures.

The invention is explained further on the basis of the following data which is given by way of example without, however, constituting any limitation.

The plastic bars with a high tensile strength are extruded using an extruder of horizontal design with automatic melt filtration unit.

The plastic bars are stretched with a high tensile strength via a plurality of stretching stands, hot-air ducts and spray ducts with bar-diverter mechanisms, during which process molecular orientation takes place.

The extruded and stretched plastic bars are wound onto spools, for example up to a length of 15,000 linear meters, by means of winders.

In order for the plastic bars with a high tensile strength to be processed further so as to form large surface area geogrids with widths of preferably 3.0 m to 6.0 m in particular of 5.0 m the spools produced are laid on spool racks. The receiving apparatuses for the individual spools preferably contain a braking device, in order to ensure that the spools are unwound in a controlled manner. For a working width of 5.0 m and an assumed distance from the centre of one plastic bar to the centre of the next plastic bar of 30 mm, using plastic bars with a width of 10 mm, 167 receiving apparatuses would be required.

However, as mentioned above, it is also possible to select other distances in the range from 10 mm to 100 mm, since, for example for drain mats, the distances are preferably reduced to as little as approx. 10 mm and below, in order to ensure pressure-stable outlet conditions in the drainage structure.

As has also already been mentioned, all the plastic bars which are to be laid in the longitudinal direction are preferably positioned parallel to one another.

The plastic bars which run in the longitudinal direction (direction of the machine) (longitudinal bars) are taken off by means of a take-off unit. The take-off unit contains a transverse cutting system for separating the longitudinal bars when changing reel and a joining device for automatically joining the new longitudinal bars to the remainder of the old longitudinal bars. Ultrasonic welding devices or vibration-welding devices are preferably used for this joining operation.

Pneumatically actuated brakes ensure that the individual longitudinal bars are pulled into the take-off unit in a controlled manner. The take-off unit is designed in such a way that a continuous stress in the individual longitudinal bars is ensured during the subsequent welding operation.

The plastic bars which run transversely to the longitudinal bars (transverse bars) are laid by means of a laying head. Preferably, up to 50 transverse bars can be laid simultaneously. The laying head is designed in such a way that it is possible to lay the up to 50 transverse bars preferably in both directions when it passes over the longitudinal bars.

During the laying operation, individual brakes ensure that the stress in the individual transverse bars remains constant.

The laid transverse bars are supplied by means of a caterpillar pull-on or pull-off of the individual welding unit for the grid crossing areas. The caterpillar pull-on comprises in each case a bottom, stationary duplex chain and two horizontally movable duplex chains. To ensure that there is sufficient pressure between the two duplex chains to stress the transverse bars, there is a pressure hose beneath the bottom chain guide, which presses the bottom caterpillar chain against the top caterpillar chain.

Concomitantly moving cutting devices cut through the laid, stressed transverse bars just before they are conveyed into the welding device.

The vibration-welding apparatus comprises, for example, 10 vibration devices which are arranged next to one another and each have a large vibration plate with integrated vibration frame, drive generators, amplitude-control circuit board and vibration-limiting device. The dimensions of the individual vibration devices are, for example, 475 mm×720 mm, so that all 10 vibration devices together allow, for example, from approx. 4000 to approx. 8000 individual welds to be carried out in a single operation. The welding operation preferably takes place in a range between 60 and 300 Hz, in particular between 150 and 180 Hz, and at amplitudes of up to 2 mm.

The 10 vibration devices each have a complete machine frame. The 10 corresponding bottom tools are positioned on 10 welding benches which, in order for welding to be carried out, are raised by means of in each case 4 hydraulic cylinders. Separating combs are used in the area of the welding tools in order to guide the plastic bars.

After the welding operation, the finished large surface area geogrid can be supplied to a lamination station, for example for nonwoven, woven or knitted fabrics or sheets, via a principal take-off unit, in order for composite products, for example comprising grid and nonwoven, to be produced for use as a plastic drain element or as a separating and reinforcement element, in an operation which immediately follows the production of the geogrid. The lamination on one or both sides may be carried out by means of a heated tool, hot air, adhesive, etc. Following the lamination, the composite products are fed to the cutting and winding unit.

The geogrids according to the invention which have been laminated to sheets are eminently suitable for tarpaulins for freight and lorries, and for temporary roofs.

In addition to their principal application areas mentioned in the introduction, the geogrids according to the invention themselves may also be used to construct fences, for example as animal protection fences, or to construct fences used in animal rearing, or to construct fences to secure construction sites, as avalanche protection or as protection against falling rocks.

The invention claimed is:

1. A geogrid manufactured by a continuous production process comprising the steps
   (a) furnishing a number of single-layer, homogeneous, molecular-oriented thermoplastic bars with a high tensile strength positioned parallel to one another in a direction of the machine, and designated as longitudinal bars, in such a way that a continuous stress in the individual longitudinal bars is ensured during a subsequent friction welding operation;
   (b) laying a number of single-layer, homogeneous, molecular-oriented thermoplastic bars with a high tensile strength onto the longitudinal bars transversely to the direction of the machine, and designated as transverse bars, in such a way that a constant stress remains in the individual transverse bars, forming a multiplicity of crossing areas arranged next to and behind one another;
   (c) conveying intermittently said longitudinal bars together with the transverse bars laying on the longitudinal bars, into a friction welding apparatus having at least one vibration-welding device equipped with a vibration plate, which vibration plate has a large surface area and which vibration plate is used to friction weld at least 100 crossing areas simultaneously; and
   (d) friction welding all crossing areas of the thermoplastic bars under pressure simultaneously by vibration, whereby the plastic bars at their crossing areas are made to vibrate with frequencies and amplitudes which are such that the surfaces soften, and, in this way, are welded together under pressure.

2. A geogrid manufactured according to claim 1 wherein a corresponding number of friction welding devices are set up next to one another depending on a desired width,
   wherein in each case from 100 to 500 crossing areas can be welded simultaneously with one of said friction welding devices,
   and wherein said friction welding devices are made to vibrate simultaneously at equal pressures and amplitudes and frequencies.

3. A geogrid manufactured according to claim 1, further comprising
   vibration welding simultaneously from about 500 to 8000 crossing areas.

4. A geogrid manufactured according to claim 1, further comprising
   inducing a plurality of friction welding devices to vibrate simultaneously at equal pressures and amplitudes and frequencies, wherein
   the amplitudes are disposed in a range from about 0.5 mm to 2.5 mm and wherein the frequencies are disposed in a range from about 60 to 300 Hz.

5. A geogrid manufactured according to claim 1, further comprising
   positioning plastic bars for crossing over one another in such a way that the transverse bars cross the longitudinal bars at an angle of from 45° to 90°.

6. A geogrid manufactured according to claim 1, further comprising
   positioning plastic bars for crossing over one another in such a way that the plastic bars which run transversely to the direction of the machine, and are designated as transverse bars, cross the plastic bars, which run parallel to one another in the direction of the machine and are designated as longitudinal bars, at an angle of from 45° to 90°.

7. A geogrid manufactured according to claim 1, further comprising
arranging the plastic bars in such a way that the plastic bars are disposed at a distance of from about 10 to 100 mm from one another and from side edge to side edge.

8. A geogrid manufactured according to claim 1, further comprising
arranging a number of plastic bars in a direction of the machine and a corresponding number of plastic bars in a direction transverse thereto such that an overall width of the geogrid is from about 3 m to 6 m and wherein an overall length of the geogrid is from about 25 m to 500 m.

9. A geogrid manufactured according to claim 1, further comprising
producing plastic bars having a tensile strength of from about 300 to 800 N/mm2.

10. A geogrid manufactured according to claim 1, further comprising
producing plastic bars having a square cross section with a side length of from about 2 mm to 6 mm.

11. A geogrid manufactured according to claim 1, further comprising
stamping the plastic bars on their top side or bottom side, wherein the plastic bars used have a stamped depth on their top and/or bottom sides of from 0.5 to 30%, based on the thickness of the plastic bars.

12. A geogrid manufactured according to claim 1, further comprising
selecting the longitudinal bars such that they are wider or thicker as compared with the transverse plastic bars used in the transverse direction.

13. A geogrid manufactured according to claim 1, further comprising
producing the plastic bars from a member of the group consisting of polyethylene terephthalate (PET), polypropylene (PP), and mixtures thereof.

14. A geogrid manufactured according to claim 1, further comprising
additionally laminating a fabric selected from the group consisting of nonwoven, woven or knitted fabrics onto one or both sides of a finished large surface area geogrid with a heated tool, with hot air or with adhesive.

15. A geogrid having a large surface area and comprising single-layer, homogeneous, molecular-oriented bars with a high tensile strength which cross one another forming a multiplicity of crossing areas arranged next to and behind one another, wherein
transverse bars forming an upper layer and disposed next to each other at a distance are resting on longitudinal bars forming a lower layer and disposed next to each other at a distance thereby forming a grid arrangement, wherein this grid arrangement is solidly connected at crossing areas of transverse bars and longitudinal bars by friction welding, and wherein the directly contacting surfaces of transverse bars and longitudinal bars in the crossing areas were directly heated and welded together by friction of said contacting surfaces.

16. Geogrids comprising
longitudinal bars forming a lower layer and disposed next to each other at a distance;
transverse bars forming an upper layer and disposed next to each other at a distance and disposed resting on the longitudinal bars forming the lower layer, wherein the longitudinal bars and the transverse bars cross one another, form a grid arrangement having a multiplicity of crossing areas arranged next to and behind one another, wherein this grid arrangement is solidly connected at the crossing areas of longitudinal bars and traverse bars by friction welding, and wherein the directly contacting surfaces of the longitudinal bars and the transverse bars in the crossing areas were heated and welded together by friction thereby furnishing a geogrid having a large surface area and comprising single-layer, homogeneous, molecular-oriented bars with a high tensile strength.

* * * * *